March 27, 1928.

C. F. HARPER 1,663,595

MAGNETO COIL ALIGNING TOOL

Filed Dec. 6, 1926

Inventor
Clarence F. Harper

By Clarence A. O'Brien
Attorney

March 27, 1928.
C. F. HARPER
1,663,595
MAGNETO COIL ALIGNING TOOL
Filed Dec. 6, 1926   2 Sheets-Sheet 2
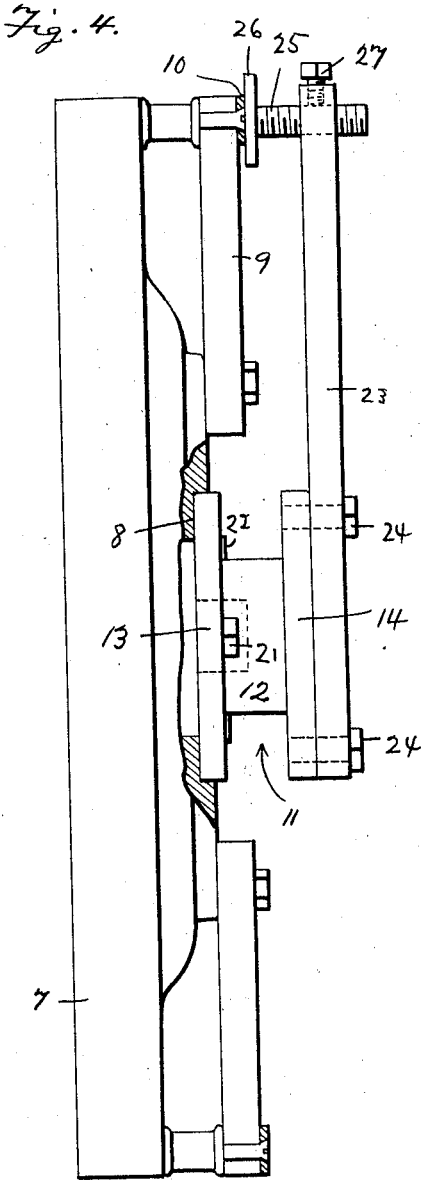
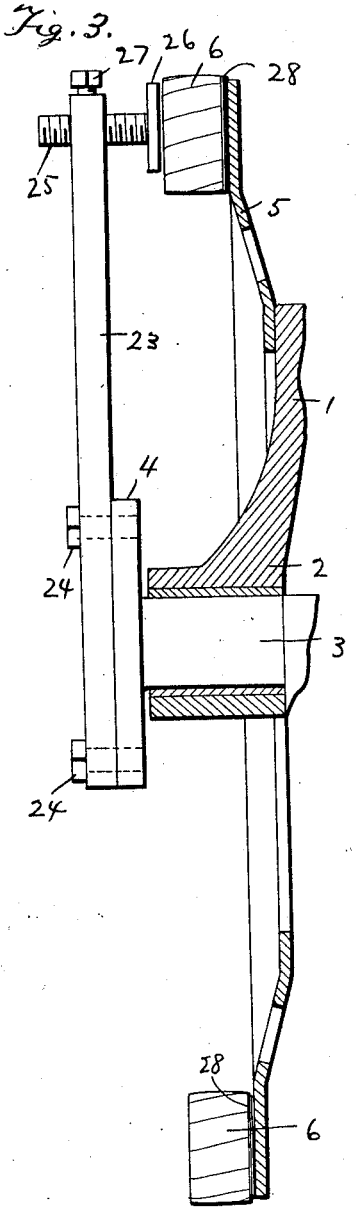
Inventor
*Clarence F. Harper*
By *Clarence A. O'Brien*
Attorney Patented Mar. 27, 1928.

1,663,595

UNITED STATES PATENT OFFICE.

CLARENCE FREDERIC HARPER, OF HARPER, TEXAS.

MAGNETO-COIL-ALIGNING TOOL.

Application filed December 6, 1926. Serial No. 152,997.

This invention relates to a tool adapted for use in aligning magneto coils which is particularly adapted for aligning the coils in a Ford type of magneto.

This invention comprehends the provision of a simple tool which may be readily applied and set on the fly wheel of the Ford type magneto to gauge the relation of the mounting of the magnet thereon, relative to the mounting of the fly wheel on the end of the crank shaft, in such a manner that the gauge may then be removed from the fly wheel and applied on the flange on the crank shaft so that the coils of the magneto may be properly set on their supporting structure, for spacing the proper distance from the ends of the permanent magnet when the fly wheel and the magnets are mounted in assembled relation, on the crank shaft.

In the present practice in the art, when it is necessary to renew or replace the magnets in the magneto of the Ford type of motor, the fly wheel and assembled structure must be entirely removed from the flange on which it is secured to the crank shaft, to permit access to the magnets and the coils, and in replacing any or all of the coils they must be set on the supporting structure therefor in such a manner that the ends of the coils disposed toward the permanent magnets on the fly wheel, shall be spaced approximately one-thirty-second of an inch from these magnets.

In order to obtain the proper setting of the coils relative to the magnets for operation in the assembled relation of the parts, it is found necessary to frequently apply and remove the fly wheel from the end of the crank shaft, and to change the setting of the magnet following such application, to determine the proper spacing of the coils from the magnet, by placing shims between the coils and the supporting structure, or removing said shims until the proper setting of all of the coils is obtained.

This frequent assembly and disassembly of the fly wheel on the crank shaft requires considerable time and labor which this invention is designed to eliminate. In eliminating this time and labor in connection with the frequent assembly and disassembly of the fly wheel on the end of the crank shaft, this invention provides a tool which may be assembled on the fly wheel, in the disassembled relation thereof from the crank shaft, suitable means thereon may be set to determine the relation of the magnets and the mounting of the fly wheel on the crank shaft, following which setting the device may then be removed from the fly wheel and applied to the crank shaft so that the portion thereof set to the position of the magnets, will lie in the same position that the magnets assume in the assembled relation of the parts, and through the device, the coils may be suitably secured on their support to provide the proper spacing between the ends and the tool, so that when the fly wheel is thereafter assembled on the crank shaft, the same spacing will be obtained.

This tool may be readily applied to the fly wheel of the crank shaft, to facilitate this operation.

The invention comprehends numerous other objects residing in the details of construction, and the arrangement of the parts for carrying out the invention, which are more particularly pointed out in the following description in detail, and in the claims directed to the preferred form of the construction, it being understood however, that various changes in the size, shape and arrangement of the parts may be made without departing from the spirit or scope of the invention as herein set forth.

In the drawings forming part of this application:—

Fig. 3 shows the tool applied to the end of the crank shaft of the Ford type of motor, and illustrates how the magneto coils are aligned therewith, to obtain the proper setting of the coils for the assembled relation of the magneto.

Fig. 4 shows the manner of setting the tool on the fly wheel, in order that it may be subsequently used as shown in Fig. 3, for setting the coils on their supports.

Figure 1:
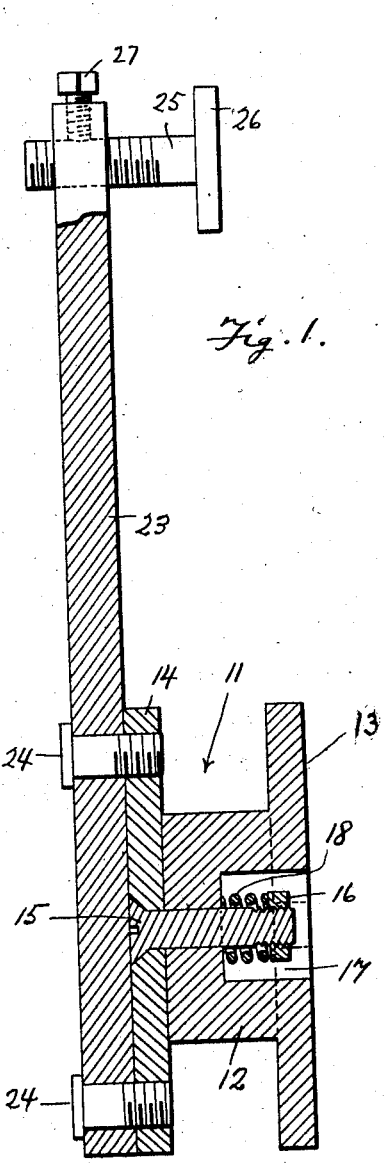
Figure 1 is a vertical sectional view thru the tool forming the subject matter of this invention, in which the several parts of the tool are shown in assembled relation.
Figure 2:
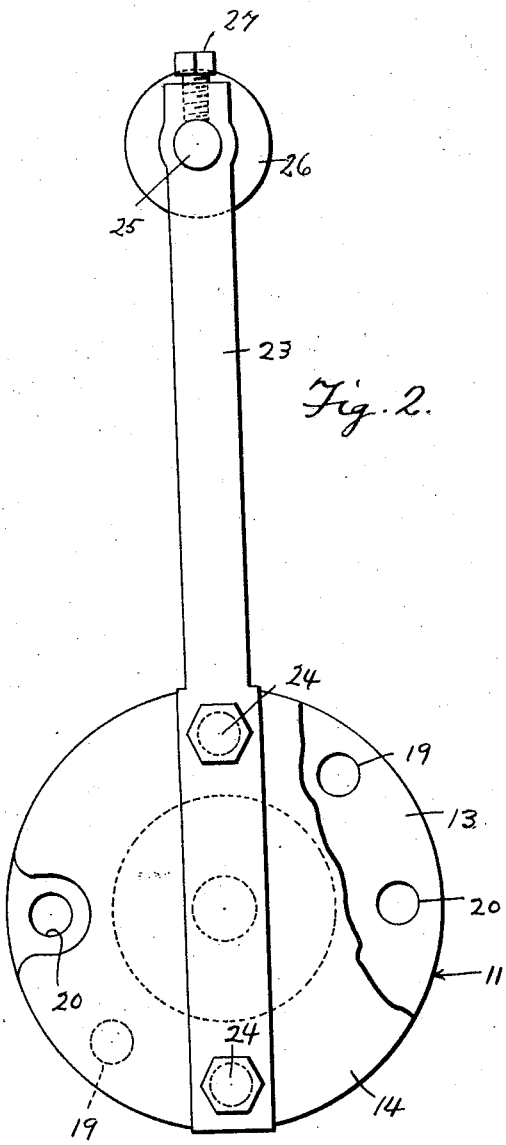
Fig. 2 is an end elevation of the tool as shown in Fig. 1, taken at the left hand side, as shown in Fig. 1.

A portion of the engine block or cylinder block is indicated at 1 in Fig. 3, which is provided with the rear bearing for the crank shaft at 2, the crank shaft being indicated at 3, and having the flange 4 on the rear end thereof. A suitable supporting ring 5 is secured to the cylinder block 1 on which are mounted a plurality of electro-magnetic coils 6 in circumferential relation, projecting laterally from the rear peripheral portion of the ring 5 in the usual manner.

The usual fly wheel 7 is formed with an annular socket 8 and as shown in Fig. 4, so as to receive the flange 4 on the end of the crank shaft 2 secured by suitable bolts in a well known manner. This fly wheel on the face adjacent to the ring 5, carries a plurality of radially arranged permanent magnets 9 secured to the fly wheel by suitable clamp plates 10, in a manner also well known in the art.

In the assembled relation of the magnets, and the coils 6 with the fly wheel assembled on the flange 4 of the crank shaft, it is necessary for the proper operation of the magneto that the faces of the clamp plates 10 be spaced a distance $\frac{1}{32}$ inch from the ends of the coils 6.

In the repair and replacement of parts of the magneto, it is always necessary to disassemble the fly wheel from the flange 4 of the crank shaft, in order to obtain access to the coil 6 and the magnets 9. After the fly wheel is disassembled from the crank shaft, there is no manner in which the proper setting of the coils 6 to obtain the proper spacing of the ends of the coils from the clamp plates 10 can be determined except by replacing the fly wheel in the assembled relation on the crank shaft, so that in renewing any coil 6 of the series arranged in circumferential relation on the supporting ring 5, it is the usual practice to determine the proper spacing of the coil from the clamp plates to reassemble the fly wheel after placing the new coil in what is believed to be the proper position, and then determining whether the spacing of the end is proper.

This operation frequently requires several operations of assembling and disassembling the fly wheel on the crank shaft, and the placing or removing of shims from the coils and the support 5 until the proper distance in the assembled relation of the fly wheel on the crank shaft, is obtained between the clamp placed in the end of any particular coil or coils.

This invention in eliminating the necessity for frequently reassembling the fly wheel on the crank shaft to determine the proper setting of the coils, provides a spool member 11 which includes the body member 12 having the annular outwardly projecting flange 13 on one end thereof, and the annular plate member 14 removably and rotatably secured to the other end thereof, through the medium of the retaining screw 15. The end of this retaining screw 15 threadedly receives a nut 16 on the end thereof within the socket 17 of the body member 12, against which seats the compression spring 18 and engaged with the bottom of the recess at its other end, so as to provide a desired tension on the bolt 15 to effectively retain the annular plate 14 in firm engagement with the end of the body 12.

The flange 13 is provided with the diametrically opposite pairs of openings 19 and 20 respectively, the openings 19 being adapted to receive suitable bolts 21, as shown in Fig. 4, for securing the body in the recess 8 of the fly wheel. These bolts extend through the usual opening for receiving the bolts which attach the fly wheels to the flange on the crank shaft, and the openings 20 are adapted to receive the pins 22 provided on the fly wheel in the recess 8 as shown in Fig. 4, which predetermines the position of the fly wheel in its mounting on the crank shaft.

In this position of the spool 11 as shown in Fig. 4 on the fly wheel, the plate 14 is spaced outwardly from the face of the fly wheel beyond the plane of the clamp plate 10 securing the magnets in position. An arm 23 is secured to the face of the plate 14 by suitable bolts 24 and projects radially from the disk 14, terminating adjacent the outer edge of the fly wheel and in one side thereof, as clearly shown in Fig. 4, where it mounts the gauge screw 25, having the enlarged head 26 provided on one end thereof.

This gauge screw is adapted to be locked in a set position of adjustment by the set screw 27, threaded in the end of the arm 23.

When it is desired to set the coils of a magneto on a supporting ring 5, in the proper position to be spaced $\frac{1}{32}$ of an inch from the clamp plates 10 on the fly wheel, in the assembled relation of the fly wheel on the crank shaft, the fly wheel assembly is removed from the crank shaft in the usual manner, and the desired coils 6 removed and replaced by new coils. During the replacing of these coils, this device is used first by securing the spool 11 in the socket 8 formed in the fly wheel as clearly shown in Fig. 4, in order that the plate 14 will support the arm 23 in spaced relation beyond the transverse plane of the magnet 9 and the clamp plate 10 on the fly wheel, so that the bolt connection between the disk 14 and the body 12 will permit rotation of the arm after the spool is secured in place on the fly wheel.

With the arm 23 secured in this relation to the fly wheel 7, the gauge screw 25 is then in position to be moved in the end of the arm so that the head 26 thereon may have its face engaged with the clamp plate 10. This engagement will be with such slight pressure that the arm may be rotated about the spool to obtain the proper gauging for each clamp plate on the fly wheel. When this setting of the gauge screw 25 is properly determined, the set screw 27 is threaded inwardly in the arm to lock the gauge screw in the set position.

When the bolts 24 are removed from the disk 14, and following which the thus-freed arm 23 is then applied to the face of the flange 4 on the crank shaft as shown in Fig. 3, the same bolts are used for securing said arm to the flange. The face of the head 26 of the gauge screw in the position shown in Fig. 3, will then assume the same position as the spaces of the clamps 10 will assume when the fly wheel is assembled on the crank shaft, so that it will be readily seen that the coil 6 which is being renewed on the support 5 can be properly adjusted to set the space thereof $\frac{1}{32}$ of an inch from the face of the head 26 on the gauge screw 25 by properly inserting or removing shims 28 from between the coil 6 and its support 5.

When the proper setting of the coils has been obtained for each coil on the ring 5, the mechanic will then know that all of the coils are properly positioned to have the proper spacing between the ends thereof and the clamp plates 10 in the assembled relation of the fly wheel on the crank shaft.

Following this, the spool and the arm 23 are removed from the fly wheel and the crank shaft respectively, and the fly wheel then assembled on the flange 4 of the crank shaft in the usual manner, and the proper spacing of the ends of the coil 6 from the clamp plates will thereby be obtained.

It should therefore be readily appreciated that a highly novel and useful tool construction has been provided for use to eliminate substantial time and labor heretofore necessary in mounting and properly positioning the coils of a Ford magneto on the support therefor, so that they will have the proper spacing from the clamp plates on the fly wheel in the assembled relation of the parts.

Having thus described my invention, what I claim as new is:—

1. An implement for facilitating the adjustment of magneto coils, comprising a cylindrical body member having means at one end whereby it may be detachably connected to the crank-shaft side of a fly wheel with the axis of the member in alignment with that of the wheel, the side of the wheel having secured thereto magneto parts comprising the circular series of permanent magnets and their clamp plates, a disc member, means for rotatably mounting the disc member at the free end of the body member with the axes of the two members in alignment, an arm removably mounted at one end on said disc member and extending radially therefrom, said arm having threaded through its free end a gage screw extending parallel to the axis of the members so that it may be adjusted to contact with the magnet clamp plates on the wheel, the axial dimensions of the said members being such that, after said gage screw is thus adjusted and the arm detached from the disc member, the arm may be correspondingly secured to the fly-wheel flange of the crank-shaft so that its gage screw may be utilized in axially positioning the magneto coils distributed about the shaft.

2. An implement for facilitating the adjustment of magneto coils, comprising a body member having means at one end whereby it may be detachably connected to the crank shaft side of a flywheel, a disk member, means for rotatably mounting the disk member at the free end of the body member, an arm adapted to be removably mounted at one end on the outer face of said disk member so as to extend radially therefrom and means for detachably securing the arm to said member, said means being adapted, upon detachment of the arm, to be utilized to secure the arm to the fly wheel flange of the crank shaft.

In testimony whereof I affix my signature.

CLARENCE FREDERIC HARPER.